(12) United States Patent
Knauth

(10) Patent No.: US 9,025,817 B2
(45) Date of Patent: May 5, 2015

(54) SYSTEM AND METHOD FOR LEAK DETECTION

(75) Inventor: Jonathan Patrick Knauth, Sauquoit, NY (US)

(73) Assignee: Critical Imaging, LLC, Utica, NY (US)

( * ) Notice: Subject to any disclaimer, the term of this patent is extended or adjusted under 35 U.S.C. 154(b) by 315 days.

(21) Appl. No.: 13/604,162

(22) Filed: Sep. 5, 2012

(65) Prior Publication Data

US 2014/0064553 A1    Mar. 6, 2014

(51) Int. Cl.
*G06K 9/00* (2006.01)
*G08B 21/20* (2006.01)

(52) U.S. Cl.
CPC ............ *G06K 9/00771* (2013.01); *G08B 21/20* (2013.01)

(58) Field of Classification Search
USPC .......................................................... 382/103
See application file for complete search history.

(56) References Cited

U.S. PATENT DOCUMENTS

| | | | |
|---|---|---|---|
| 4,834,533 A * | 5/1989 | Horike et al. | 356/133 |
| 5,637,871 A * | 6/1997 | Piety et al. | 250/330 |
| 6,116,776 A | 9/2000 | Bowling | |
| 6,866,089 B2 | 3/2005 | Avila | |
| 7,358,860 B2 * | 4/2008 | Germouni et al. | 340/605 |
| 7,881,366 B2 * | 2/2011 | Kubota et al. | 375/240 |
| 7,897,919 B2 | 3/2011 | King | |
| 8,474,929 B2 * | 7/2013 | Kikkawa et al. | 347/6 |
| 2008/0313152 A1 * | 12/2008 | Yoon et al. | 707/3 |
| 2010/0118137 A1 | 5/2010 | Avila et al. | |
| 2010/0284570 A1 | 11/2010 | Grimberg | |

* cited by examiner

*Primary Examiner* — Shefali Goradia
(74) *Attorney, Agent, or Firm* — Paul Frank + Collins PC

(57) ABSTRACT

This disclosure describes embodiments of systems and methods that can identify and image leaks and spills while simultaneously viewing the unchanging background. In one embodiment, the system includes an image capture device and an image processing device, which receives a first image frame and a second image frame from the image capture device. The image processing device can identify a region of variation in the second image frame that corresponds to a change in a scene parameter (e.g., temperature) as between the first image frame and the second image frame. These embodiments provide a normal dynamic range thermal image that can be colorized to identify the leak or spill as the leak or spill develops over time. The systems and methods can minimize false alarms, addressing potential issues that arise in connection with meteorological events (e.g., precipitation), noise sources, and relative motion between the image capture device and the scene.

26 Claims, 9 Drawing Sheets

SYSTEM AND METHOD FOR LEAK DETECTION

BACKGROUND OF THE INVENTION

The subject matter disclosed herein relates to leak detection and, in particular, to systems and methods for detection and display of effluent using optical detection systems, e.g., thermal imaging systems.

Many industries seek efficient means to perform in-situ detection of leaks and other component failures that allow effluent to discharge, e.g., from pipes, tanks, etc. By detecting leaks early, these industries can avoid the discharge of large amounts of materials, many of which may be carcinogenic, toxic, flammable, and explosive. Early detection can reduce the cost of necessary clean-up and decontamination, as well as limit repair costs and improve profits by stemming the flow of material that is lost, e.g., by leakage from a pipeline. In fact, regulations in some industries often require constant monitoring of equipment to control and reduce the incidence of leakage.

One type of in-situ detection systems have sensing devices that detect volatile organic compounds (VOCs) and other gases. Although accurate to generate gas concentration readings, these sniffer systems are labor-intensive and require the sensing devices to be in close proximity to the components under observation. Another type of detection system utilizes optical detection. These systems deploy devices including lasers and cameras sensitive to various wavelengths of electromagnetic radiation (e.g., infra-red). Thermal imaging systems, for example, are optical detection systems that can generate a video image. Processing of this video image can graphically display temperature distributions, which can prove useful for some types of leak detection.

Unfortunately, thermal imaging does not provide a robust solution for the broad range of fluids (e.g., gas and liquids) that may require in-situ detection technology. For example, detection of specific temperatures on the temperature distributions as an indicator of leakage or spills is likely unreliable because the absolute or radiation temperatures of spilled fluids is often unknown. Moreover, conventional controls (e.g., gain and level controls) and other color algorithms found on thermal imaging systems do not provide adequate visualization of leaks and spills because of the low signal levels and broad dynamic temperature range found in scenes under observation. Thermal imaging is particularly difficult for materials that exhibit particularly low thermal signatures, e.g., gasses.

To address some of these issues, leak detection systems may utilize various image processing techniques. Difference imaging, for example, is one technique that compares images to identify certain thermal changes that might indicate a leak or spill. The images may include a background (or pre-spill) thermal image and a current (or spill) thermal image. The comparison removes the dynamic temperature range of the scene. Difference imaging and related techniques do not, however, comport with continually changing ambient conditions. Nor do these techniques deal well with changes in the sensitivity of thermal imaging equipment. Rather, changes in the scene and/or equipment can give rise to spurious signals that are indistinguishable from signals that indicate that a spill or leak is underway. Other image processing techniques compare a pre-stored reference image, which shows a view of a known, non-leaking part or component, to a current image of the component under observation. In this case, problems can arise because the current image must show the component under observation in exactly the same orientation and view as the component that is found in the reference image. Other leak detection systems, e.g. pyroelectrics and similar AC coupled detectors, inherently apply difference imaging. These systems, however, require an external chopper wheel in order to produce a continuous stream of video that includes both the dynamic scene temperature changes and the unchanging background.

BRIEF DESCRIPTION OF THE INVENTION

This disclosure describes embodiments of systems and methods that can identify and image leaks and spills while simultaneously viewing the unchanging background. These embodiments provide a normal dynamic range thermal image that can be colorized to identify the leak or spill as the leak or spill develops over time. As set forth more below, the systems and methods can minimize false alarms, addressing potential issues that arise in connection with meteorological events (e.g., precipitation), noise sources, and relative motion between the image capture device and the scene.

The present disclosure describes, in one embodiment, a method for detecting effluent from a target under observation. The method comprises, at an image processing device comprising a processor and memory, receiving a first image frame and a second image frame of a scene captured in a field of view of an image capture device. The method also comprises identifying a first region in the second image frame with a parameter variation value satisfying a first threshold criteria in which the parameter variation value defines a rate of change in a scene parameter between the first image frame and the second image frame. The method further comprises generating an output in response to the presence of the first region in the second image frame.

The present also disclosure also describes, in one embodiment, a method for detecting effluent from a target under observation. The method comprises, at an image processing device comprising a processor and memory, receiving signals from an array of pixels on an image sensor in which the signals encode a first image frame and a second image frame. The method also comprises identifying one or more alarm pixels from the array of pixels in which the one or more alarm pixels exhibit a rate of change in temperature from the first image frame to the second image frame that satisfies a threshold criteria. The method further comprises generating an output in response to the presence of the one or more alarm pixels.

The present disclosure further describes, in one embodiment, an optical imaging system that comprises an image processing device comprising a processor, memory, and one or more executable instructions stored on the memory and configured to be executed by the processor. The executable instruction comprise one or more executable instructions for receiving a first image frame and a second image frame of a scene and identifying a first region with a parameter variation value satisfying a first threshold criteria in which the parameter variation value defines a rate of change in a scene parameter between the first image frame and the second image frame. The instructions also comprise generating an output in response to the presence of the first region in the second image frame.

The present disclosure yet further describes, in one embodiment, a computer program product for detecting effluent in a video stream. The computer program product comprises a computer readable storage medium having executable instructions embodied therein. The executable instructions comprise one or more executable instructions for receiving a first image frame and a second image frame of a scene captured in a field of view of a thermal imaging device, identifying a first region with a parameter intensity value satisfying a first threshold criteria in which the parameter intensity value defines a rate of change in a scene parameter between the first image frame and the second image frame. The instructions also include generating an output in response to the presence of the first region in the second image frame.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1:
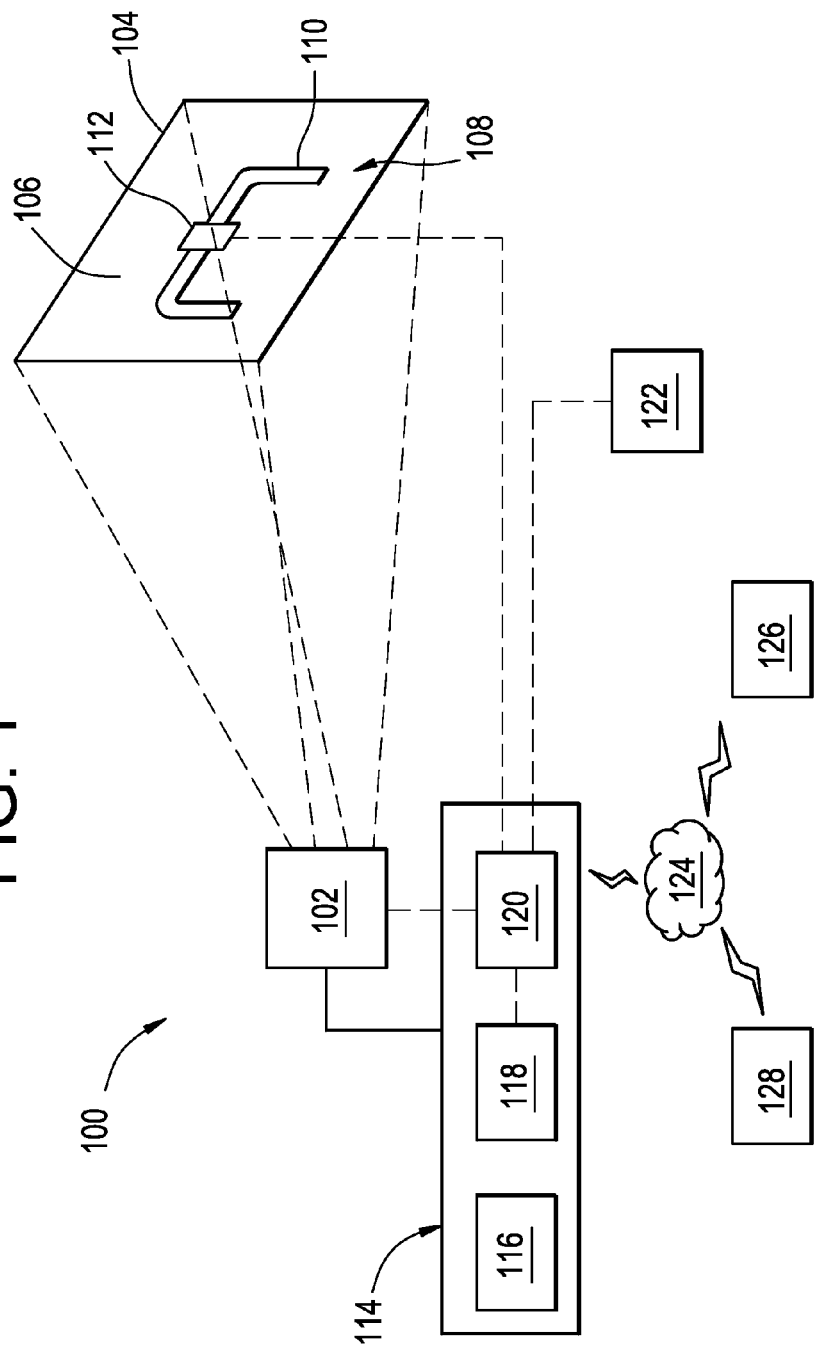
FIG. 1 depicts a schematic diagram of an exemplary embodiment of an optical imaging system.

FIG. 1 illustrates a schematic diagram of an example of an optical detection system 100 that can detect effluent that occurs at targets under observation, e.g., pipelines. The optical detection system 100 includes an image capture device 102 with a field of view 104 that captures image data of a scene 106. In the example of FIG. 1, the scene 106 includes a target 108 with one or more sections of a pipe 110 with a coupling valve 112 secured thereto. The optical detection system 100 also includes one or more components 114, which may include an image processor 116, a display 118, and a controller 120. However, although shown as separate components 114, this disclosure further contemplates configurations of the image capture device 102 that may include features and functions of one or more of the display 118 and/or components of the image processor 116. Examples of the controller 120 may communicate with the image capture device 102 and the display 118, as well as with a remote alarm 122 and/or the target 108, e.g., the coupling valve 112 or other control implement that can stop the flow of fluid through the pipe 110. In one embodiment, the optical detection system 100 can communicate via a network 124 with one or more peripheral devices 126 (e.g., a computer, smartphone, laptop, tablet, etc.) and/or an external server 128.

Examples of the image capture device 102 include thermal imaging cameras and related devices that can capture image data of the scene 106. Image data from thermal imaging cameras are particularly well suited to identify changes in temperature and related variations in thermal signatures of objects that are found in the field of view 104. Examples of the image data include data representative of still images (e.g., digital photographs), "real-time" images (e.g., video, live video, streaming video), and like data that reflects and/or represents the content in the field of view 104.

As set forth more below, the proposed methods and systems can identify a subset of the captured image data. This subset corresponds to certain parameter changes, e.g., temperature changes, that occur over time within the scene 106. These changes are useful to identify, for example, effluent (e.g., gas and liquid) that may escape from the pipe 110 and/or coupling valve 112. Exemplary materials include materials that are visible to the human eye, e.g., oil and refined oil products, as well as materials that are not readily visible to the human eye, e.g., methane gas. However, the present disclosure further contemplates use of proposed methods and systems for a variety of applications in which it is desirable to detect and display changes and variations that occur in image data and/or related to data collected by optical imaging systems.

Figure 2:
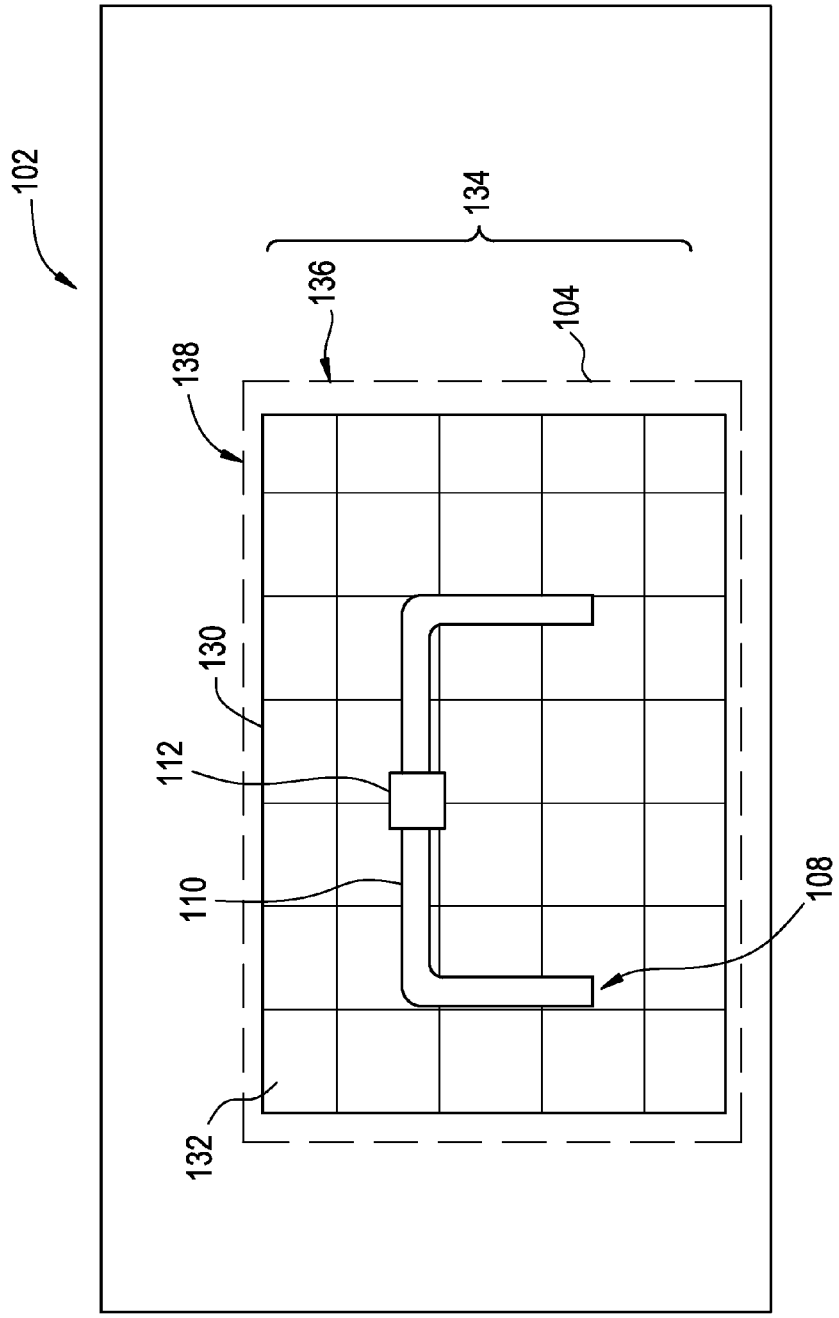
FIG. 2 depicts a schematic diagram of an example of an image sensor for use in an image capture device.

As best shown in FIG. 2, the image capture device 102 can include an image sensor 130 that can detect energy in the scene 106 (FIG. 1). The image sensor 130 includes a plurality of pixels 132 that are arranged in a grid 134 of rows 136 and columns 138. For thermal imaging cameras, in one example, the pixels 132 are sensitive to the temperature of objects in the scene 106 (FIG. 1). In one implementation, the pixels 132 generate a signal level (e.g., a voltage level) that corresponds to the energy the pixels 132 view from the scene 106 (FIG. 1). The image capture device 102 digitizes the signal level, e.g., by using an analog to digital converter. The field of view 104 for the image capture device 102 encompasses the combination of the view for all (and/or a subset of) the pixels 132 in the grid 134. For video applications, the optical detection system 100 (FIG. 1) periodically samples the signal level for the pixels 132 to generate a plurality of frames, which make up a video stream. In one implementation, the video stream displays on a monitor and/or other display devices (e.g., display 118 and/or peripheral device 126 of FIG. 1).

Figure 3:
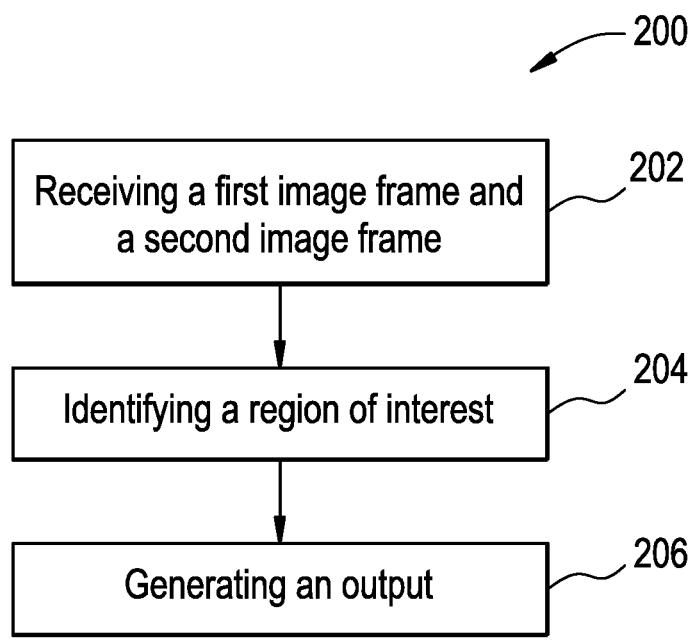
FIG. 3 depicts a flow diagram of an exemplary embodiment of a method for processing images to identify effluent flowing from a target.

To this end, FIG. 3 illustrates a flow diagram that outlines the steps of an exemplary embodiment of a method 200 for processing image data from an image capture device (e.g., image capture device 102 of FIGS. 1 and 2). The method 200 includes, at step 202, receiving a first image frame and a second image frame of a scene and, at step 204, identifying a region of interest in the second frame. The method 200 further includes, at step 206, generating an output, which in one example includes an image and or video display on which the region of interest is distinguished from the scene.

Collectively, one or more of the steps of the method 200 can be coded as one or more executable instructions (e.g., hardware, firmware, software, software programs, etc.). These executable instructions can be part of a computer-implemented method and/or program, which can be executed by a processor and/or processing device. Examples of the image capture device 102 and/or one or more associated components 114 can execute these executable instruction to generate certain outputs, e.g., an image on the display 118, an alarm signal that activates the remote alarm 122, a control signal that actuates the coupling valve 112, an electronic message for use on the peripheral device 126, etc.

Figure 4:
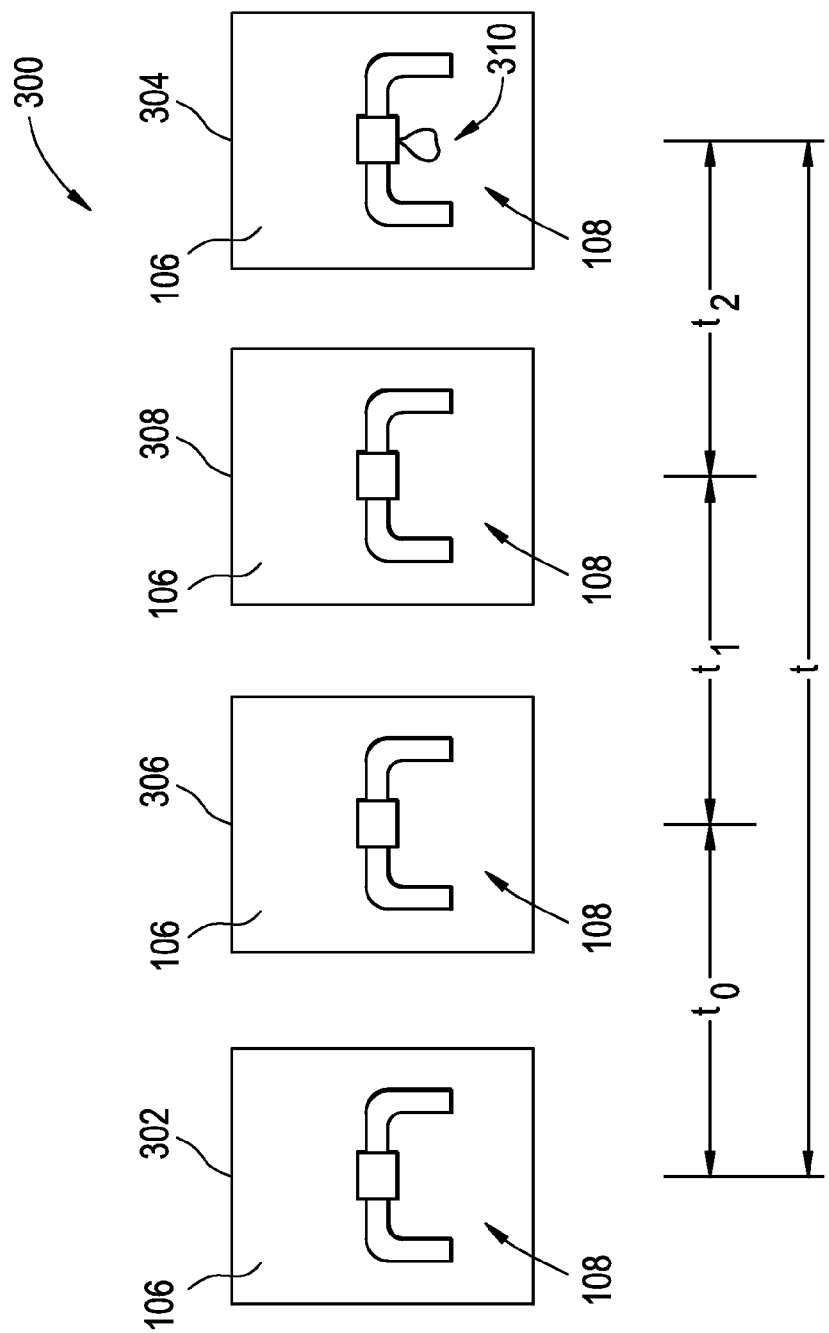
FIG. 4 depicts a schematic diagram of an example of a video stream that an optical imaging system, e.g., the optical imaging system of FIG. 1, can generate of a target under observation.

The first image frame and the second image frame (e.g., at step 202 of FIG. 3) can, in one example, form part of a video stream. FIG. 4 illustrates an example of a video stream 300 of the scene 106 (FIG. 1). The video stream 300 includes a plurality of image frames with sample image frames (e.g., a first image frame 302 and a second image frame 304) and intermediary image frames (e.g., a first intermediary frame 306 and a second intermediary frame 308). A time period t separates the first image frame 302 from the second image frame 304. The time period t comprises a plurality of frame periods (e.g., a first frame period $t_0$, a second frame period $t_1$, and a third frame period $t_2$). The frame periods define the time that elapses between chronologically adjacent image frames of the video stream 300. In the example of FIG. 4, the second image frame 304 also includes a region of variation 310, which defines an area of the second image frame 304 where a scene parameter changes as a result of effluent that emanates from the target 108 (FIG. 1). Exemplary scene parameters include temperature as well as other parameters that define conditions of the scene 106, e.g., pressure, humidity, density, and the like.

Identifying the region of variation 310 in the second image frame (e.g., at step 204 of FIG. 3) can, in one example, include processing of the image data of the video stream to calculate a parameter variation (PV) value. The PV value defines the rate of change of one or more scene parameters between a first image frame and a second image frame, which occurs later in time from the first image frame in the video stream 300. In one example, the PV value is calculated as follows in equation (1) below:

$$PV \text{ value} = \frac{Pf2 - Pf1}{t}, \quad (1)$$

wherein $P_{f1}$ is the value for the scene parameter in the second image frame, $P_{f2}$ is the value for the scene parameter in the first image frame, and t is the time period that elapses between the first image frame and the second image frame.

In one embodiment, to set out the boundaries of the region of variation 310, the method 200 can also comprise steps for comparing the PV value to a threshold criteria. In the example of FIG. 4, the region of variation 310 includes areas of the second image frame 304 in which the PV value satisfies the threshold criteria (e.g., is higher and/or lower and/or equal to the threshold criteria). Thus, in one example of temperature-based analysis, the PV value for the area of the second image frame 304 in the region of variation 310 may meet and/or exceed a specified rate of change in scene temperature. Examples of this specified rate identify a particular temperature change between two frames (e.g., the first image frame 302 and the second image frame 304) of the video stream 300. This temperature change may indicate the presence of effluent in the second image frame 304.

Calculation of the PV value can utilize any of the image frames (e.g., the image frames 302, 304 and the intermediary image frames 306, 308) within the video stream 300 for the first image frame and the second image frame. In the example of FIG. 4, and with reference to the equation (1) above, the first image frame may correspond to the first image frame 302 and the second image frame may correspond to the second image frame 304. However, this disclosure contemplates implementation of embodiments of the method 200 that are not limited to a specific selection of image frames in the video stream 300. This feature is beneficial because it permits dynamic analysis of image data. Dynamic analysis provides effectively a "running difference" in the PV value that can be used for perpetual observation and analysis, e.g., of a target under observation (e.g., target 108 of FIG. 1). Moreover, unlike conventional processing methodologies that often require a fixed reference frame (i.e., one that does not change with respect to the image frames of a video stream to which the fixed reference frame is compared), embodiments of the method 200 can compare any of the image frames of the video stream 300. When implemented in connection with an optical imaging system (e.g., optical detection system 100 of FIG. 1), embodiments of the method 200 can provide continual analysis of the image data that is captured of the target 108 under observation. This feature provides real-time analysis and leak detection independent of the frame and/or frame(s) of the video stream.

In one embodiment, the PV value may comprise a plurality of values. For example, the image data may include data from one or more individual imaging components (e.g., pixels 132 of FIG. 2) that form an image sensor (e.g., image sensor 130 of FIG. 2). The method 200 may include steps for calculating the PV value for each of the pixels that correspond to the image date data of the second image frame 304 (i.e., also a "pixel PV value") and steps for comparing the pixel PV value to the threshold criteria. Thus, in one example, only those pixels in which the pixel PV value satisfies the threshold criteria (e.g., is higher and/or lower and/or equal to the threshold criteria) will define the characteristics (e.g., size, shape, location, etc.) of the region of variation 310 in the second image frame 304. In one embodiment, the region of variation 310 will include the pixels at which the pixel PV value meets or exceeds the threshold criteria.

The method 200 can include steps for identifying or "tagging" pixels as alarm pixels, which are found in and/or define the region of variation 310. Alarm pixels can also indicate that effluent is present in the second image frame 304. In one example, the method 200 can include steps for assigning the digital signal level of pixels identified as alarm pixels with a pre-determined signal level value, which will designate the alarm pixels as part of the region of variation 310.

Embodiments of the method 200 can also include steps to avoid false designation (e.g., mischaracterization and/or misrepresentation) of the region of variation 310 in the second image frame 304. These false designations indicate that effluent is present in the second image frame 304 when, in reality, effluent is not present (i.e., no leak is present) and/or is not of sufficient quantity to cause an alarm condition that requires attention (e.g., maintenance). Exemplary false designations may result from meteorological events (e.g., precipitation) and other events that disrupt data capture and/or influence the image data in a way that can result in improper calculations of the PV value (including the pixel PV value). In one embodiment, the method 200 may include steps for comparing the number of alarm pixels (e.g., pixels at which the pixel PV value satisfies the threshold criteria) to a threshold pixel criteria. This step can confirm the presence of the region of variation 310 in the second image frame 304.

The threshold pixel criteria can, in one example, identify a minimum number of alarm pixels. If the number of alarm pixels meets or exceeds this minimum number of pixels, the region of variation 310 is present in the second image frame 304. In another example, the threshold pixel criteria can identify a maximum number of alarm pixels. If the number of alarm pixels meets or is less than this maximum number of alarm pixels, then the region of variation 310 is present in the second image frame 304. The maximum number of pixels can prevent false designations that may be the result of movement in the scene 106 that is unrelated to effluent from the target 108 and/or that may be the result of system problems (e.g., movement of the image capture device due to wind, pan, and/or tilt movement).

The method 200 can also accommodate for false designations that occur as a result of one or more operations of the image capture device. For example, the method 200 may include steps for recognizing that the image capture device is performing a device operation, e.g., zoom or focus, and for discounting and/or ignoring image data that the image capture device captures during the device operation. The method 200 may include steps for interrupting analysis of the video stream until the device operation is complete.

In another embodiment, the method 200 may also accommodate for certain image processing steps that occur peripherally to the analysis of the video stream to identify the region of variation 310. These processing steps can include non-uniformity correction, which normalizes outputs of the pixels in order to create a visually pleasing image of the scene 106. Non-uniformity correction uses a reference image taken with an internal calibration source (e.g., a shutter) to correct pixel-to-pixel variations. This type of correction includes both gain and offset corrections. Gain corrections normalize the pixel response to changes in scene energy. Offset corrections equalize the overall digital signal level of the pixels for the image(s) of the scene 106. For purposes of applying gain correction, in one example, the pixel output (e.g., the voltage level) is digitized into a signed integer, e.g., 12 to 14 bits of resolution, with the midrange set to zero for efficient application of gain correction. Offset correction can occur after gain correction. Offset correction has particular use with thermal imaging cameras and like image capture devices because this correction provides a uniform, pleasing image when viewing a range of scene temperatures. To determine the amount of offset correction, a shutter is placed in the optical path of the image sensor and a sample or "fine offset correction frame" is captured. Subsequent frames of video are multiplied by the gain correction factor and subtracted from the fine offset correction frame. A new fine offset correction frame is captured occasionally to compensate for any drift in the response of the image sensor, which can occur over time. A new fine offset correction is performed periodically, e.g., on the order of once every 10,000 frames.

In still other embodiments, the method 200 can accommodate for shake and/or drift and/or errors and issues that can cause frame-to-frame spurious signals. In one example, the method 200 may include steps for calculating a temperature drift correction value based on a region of disinterest. Examples of the region of disinterest can include the outermost rows and/or columns of pixels that make up the frame of video stream 300. In another example, the method 200 can include steps for performing shake correction. These steps may include steps for shifting the registration of memory space of the current frame (e.g., second image frame 304) of the video stream 300 and comparing the current frame to the reference frame (e.g., the first image frame 302). In one example, the method 200 can determine the degree of shake by comparing the content of the reference frame to the current frame. In another example, the degree of shake can be based on an input, e.g., from a gyro transducer associated with the image capture device. Exemplary gyro transducers provide an indication of direction and magnitude of the motion of the image capture device. The method 200 can including steps for adjusting the memory space in accordance with one or more of these indications. For example, if the gyro transducer indicates movement of 1 mm in a downward direction, the method 200 can shift the memory space of the reference frame upwards by one or more rows of data to compensate for the movement. Likewise, if the gyro transducer indicates movement of 1 mm in the opposite direction, the method 200 can shift the memory space of the reference frame downwards by one or more rows of data to compensate for the movement.

In one embodiment, the method 200 may include steps for identifying and/or distinguishing a plurality of regions of variation 310 in the image frame that relate to both the presence of effluent and to an effluent stream that occurs in the image frame. This feature may have particular application, for example, to detect effluent material in environments in which the temperature of the effluent will transition to the background temperature of the environment. In these cases, although the signal level and/or PV value for the pixels may not satisfy the threshold criteria and, thus, fail to identify alarm pixels as set forth above, end users can derive benefit from the detection of the effluent stream and/or path the effluent travels in the environment.

Figure 5:
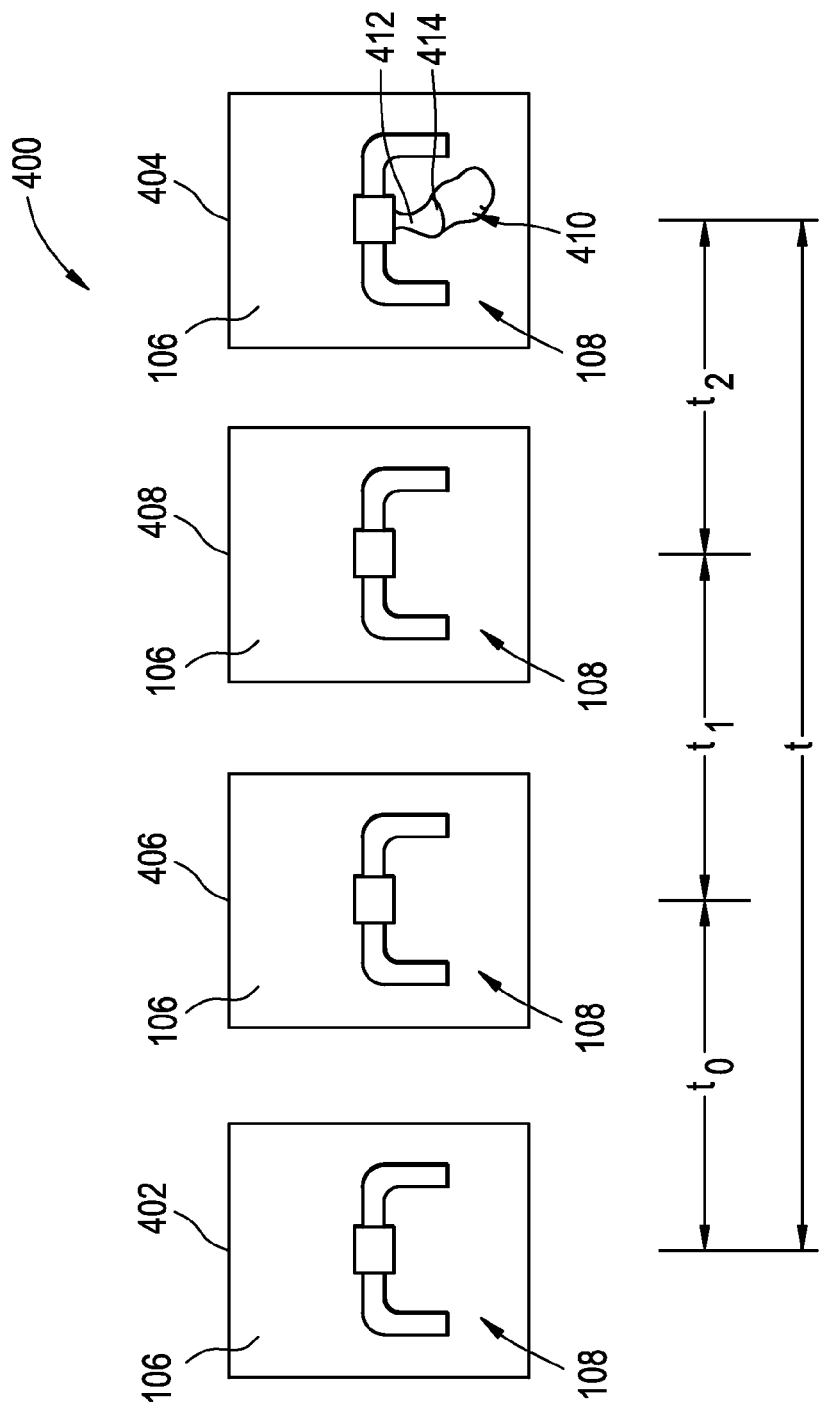
FIG. 5 depicts a schematic diagram of another example of a video stream that an optical imaging system, e.g., the optical imaging system of FIG. 1, can generate of a target under observation.

To this end, FIG. 5 illustrates an example of a video stream 400 in which the region of variation 410 includes a first region 412 and a second region 414. In one example, to set out the boundaries of the first region 412 and the second region 414, the method 200 can include steps for comparing the PV value to a first threshold criteria. As set forth above, this step can identify the first region 412 if the PV value satisfies the first threshold criteria (e.g., is higher and/or lower and/or equal to the first threshold criteria). In one embodiment, the method 200 can also include steps for comparing an absolute temperature value to a second threshold criteria. Examples of the second threshold criteria can define a range of temperature values, e.g., temperature values that are expected for effluent as the effluent temperature drifts towards the background temperature. Thus, in one example, the characteristics (e.g., size, shape, location, etc.) of the second region 414 can be determined where the absolute temperature value in the second image frame 404 satisfies the second threshold criteria. Moreover, this disclosure contemplates use of the pixel PV value (as discussed above) to determine the characteristics of both the first region 412 and the second region 414. For example, alarm pixels at which the PV value satisfies the first threshold criteria will determine the characteristics of the first region 412 and pixels at which the PV value does not satisfy the first threshold criteria but that exhibit an absolute temperature value that satisfies the second threshold criteria will determine the characteristics of the second region 414.

Generating an output (e.g., at step 206 of FIG. 3) can include a variety of indications that associate the presence of effluent in the images of the video stream. Exemplary outputs can include images and/or overlays on still and video images that distinguish the region of variation (e.g., the region of variation 310 and 410 of FIGS. 4 and 5), signals that encode instructions that activate an alarm, signals that encode instructions to operate a device (e.g., a valve), electronic messages readable on a peripheral device that comprise content that indicate the presence of effluent, and the like. This disclosure contemplates that embodiments of the methods and systems can deploy various techniques to illustrate the changes that distinguish the regions of variation from the scene background. These techniques can manipulate the actual image data to show colors and features of the regions, as well as separate date that formulates separate images (i.e., overlays) that image and display processing can show or "overlay" on the existing video stream to indicate the presence of effluent in the image frames of the video stream.

Figure 6:
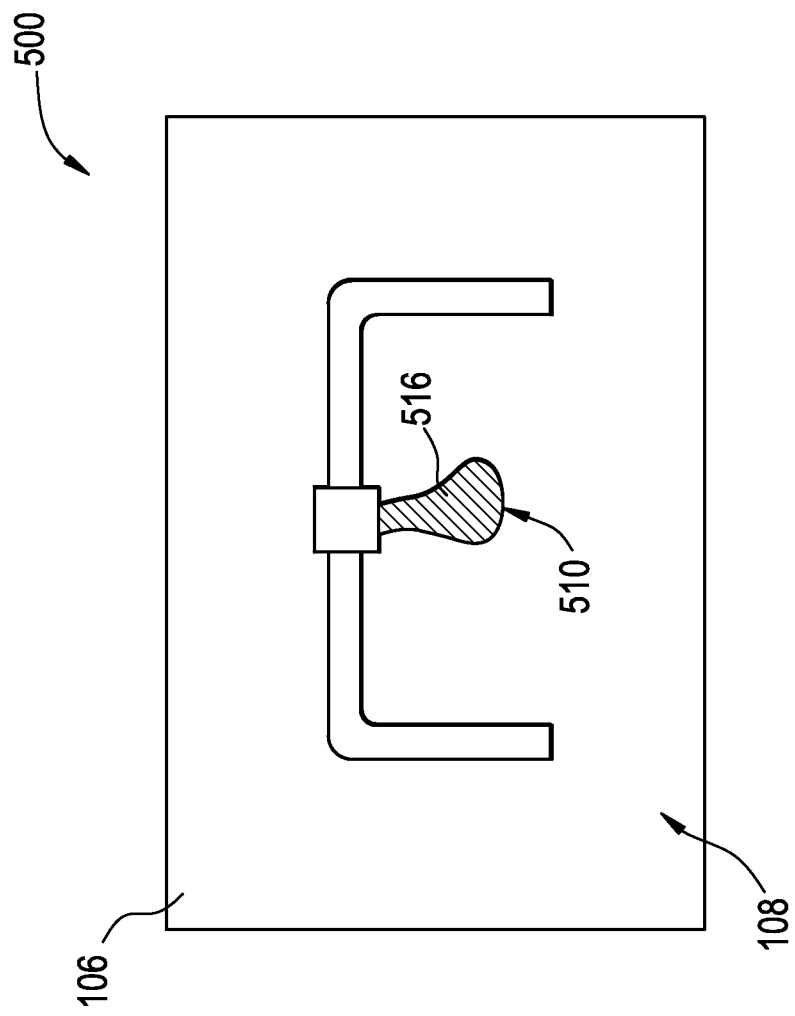
FIG. 6 depicts a schematic representation of an example of an image that distinguishes effluent from the background of a scene.
Figure 7:
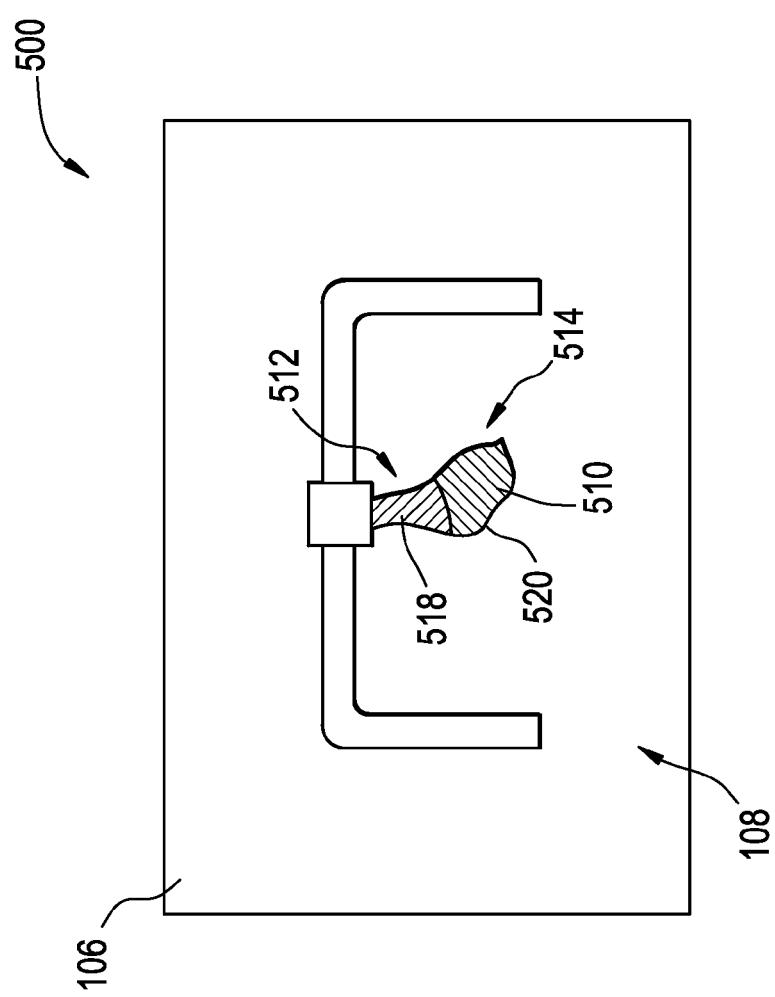
FIG. 7 depicts a schematic representation of another example of an image that distinguishes effluent from the background of a scene.

FIGS. 6 and 7 depict a schematic diagram of an exemplary image 500, e.g., a still image or video image. The image 500 shows the scene 106 with the target 108. In FIG. 6, the image 500 also shows a region of variation 510 having one or more features 516 (e.g., color, tint, brightness, grayscale, etc.) that distinguish the region of variation 510 from the remaining portions or "background" of the scene 106 in the image 500. FIG. 7 shows the region of variation 510 with a first region 512 and a second region 514 having, respectively, a first feature 518 and a second feature 520, which distinguish the regions 512, 514 from the remaining portions of the scene 106 as well as from one another.

In one embodiment, the method 200 can include one or more steps for assigning colors to the areas of the image that correspond to the region of variation 510. In one example, the method 200 can assign a first color to a first area of the image that corresponds to the first region 512 and a second color to a second area of the image that correspond to the second region 514. This "colorization" can occur at the pixel-level to formulate the first color and the second color. Exemplary colorization can include red and yellow, which a viewer of the colorized image 500 can readily discern to indicate the presence of effluent and, ultimately, that an alarm condition exists that may require attention at the target under observation. In one example, colorization can add a visual persistence to the region of variation 510 to show the progression (and/or flow) of effluent from a leak over an extended period of time. Thus, one or more colors selected for the first color and the second color can show a gradual decay, e.g., in brightness and/or hue, to illustrate the changing temperature and pattern of effluent as it flows into the background of the scene 106. This disclosure further contemplates the various configurations of color (and color parameters) that can be used to help identify the extent and flow of effluent in the scene 106. Changes and combinations in colors (and other features) and colorization techniques can help, for example, to present to the end user a more complete picture of the progression and movement of effluent from image frame to image frame in the video stream.

As mentioned above, the method 200 can also include one or more steps for generating signals that encode instructions, e.g., for causing operation of devices. Examples of these signals (and/or the encoded instructions) can be compatible with devices to activate alarms (e.g., remote alarm 122 of FIG. 1) and/or to operate a valve device (e.g., coupling valve 112 of FIG. 1). Still other signals can comprise electronic messages that are sent to one or more peripheral device. The content of the message can vary, although in one example the message can alert the recipient to the presence of effluent at the point of observation.

Figure 8:
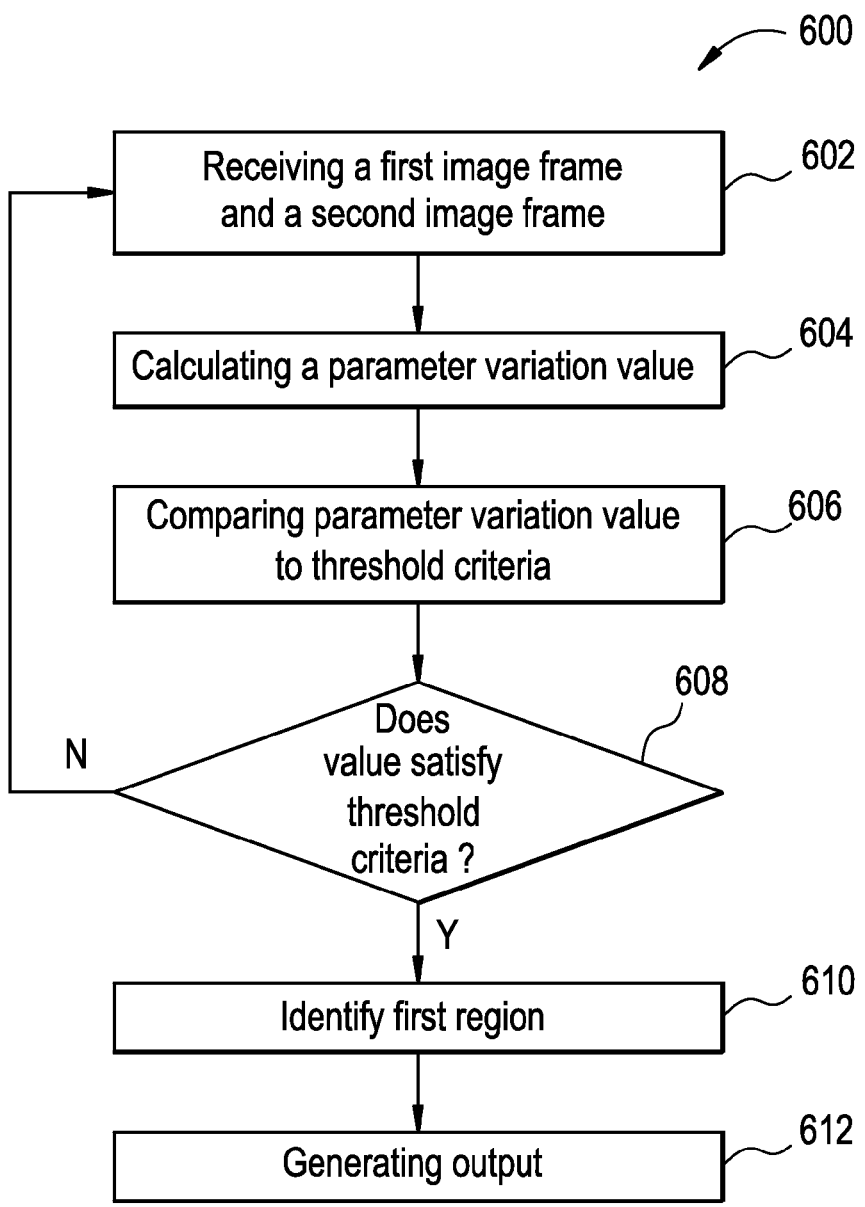
FIG. 8 depicts a flow diagram of another exemplary embodiment of a method for processing images to identify effluent flowing from a target.

In view of the foregoing discussion, and as best shown in FIG. 8, embodiments of a method 600 can comprise, at step 602, receiving a first image frame and a second image frame of a scene captured in a field of view of an image capture device. The method 600 can also comprise, at step 604, calculating a parameter variation value for the second image frame and, at step 606, comparing the parameter variation value to a first threshold criteria. The method 600 can further comprise, at step 608, identifying a first region in the second image frame in which the parameter variation value satisfies the first threshold criteria and, at step 610, generating an output in response to the presence of the first region in the second image frame. In one example, the parameter variation value defines a rate of change in a scene parameter between the first image frame and the second image frame. One or more of the steps can be performed at an image processing device comprising a processor and memory.

Still other embodiments of the method 600 can comprise one or more steps for receiving signals from an array of pixels on an image sensor, the signals encoding a first image frame and a second image frame, calculating a rate of change in temperature from the first image frame to the second image frame, comparing the rate of change in temperature to a threshold criteria, and identifying one or more alarm pixels from the array of pixels, and generating an output in response to the presence of the one or more alarm pixels. In one example, the one or more alarm pixels exhibit a rate of change in temperature from the first image frame to the second image frame that satisfies a threshold criteria. One or more of the steps can be performed at an image processing device comprising a processor and memory.

Figure 9:
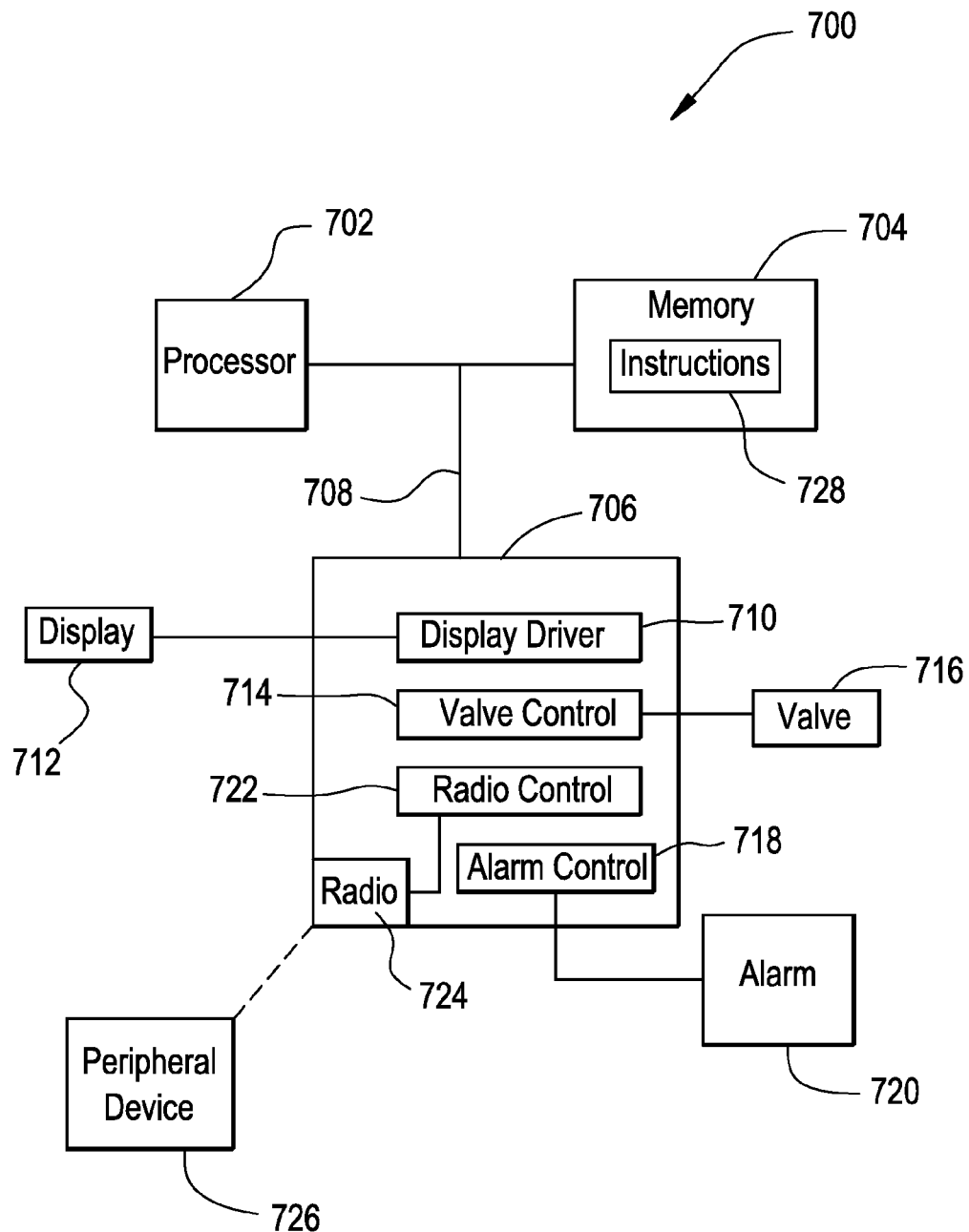
FIG. 9 depicts a high-level wiring schematic of an example of an image processing device for use in an optical imaging system, e.g., the optical imaging system of FIG. 1.

FIG. 9 depicts a schematic diagram that presents, at a high level, a wiring schematic for an image processing device 700 that can processing image data to generate an output indicative of the presence of effluent emanating from a target. The image processing device 700 can be incorporated as part of image capture device (e.g., a thermal imaging camera) and/or other device that couples to the image capture device to receive image data representing a scene. The image processing device 700 includes a processor 702, memory 704, and control circuitry 706. Busses 708 couple the components of the image processing device 700 together to permit the exchange of signals, data, and information from one component of the image processing device 700 to another. In one example, the control circuitry 706 includes display driver circuitry 710 which couples with a display 712 (e.g., a monitor, television, computer, etc.) and valve control circuitry 714 that couples with a valve 716. The control circuitry 706 also includes alarm control circuitry 718, which couple with an alarm device 720, and radio driver circuitry 722 that couples to a radio 724, e.g., a device that operates in accordance with one or more of the wireless and/or wired protocols for sending and/or receiving electronic messages to and from a peripheral device 726 (e.g., a smartphone). As also shown in FIG. 9, memory 704 can include one or more software programs/ instructions 728 in the form of software and/or firmware, each of which can comprise one or more executable instructions configured to be executed by the processor 702.

This configuration of components can dictate operation of the image processing device 700 to analyze image data of a video stream to identify effluent and other anomalies in one or more frames of the video stream. For example, the image processing device 700 can generate images (e.g., still images and video images) that identify regions of interest on the display 712. The image processing device 700 can also provide signals (or inputs or outputs) that indicate alarm conditions (e.g., the presence of effluent) to the alarm device 720 or that instruct operation of the valve 716.

The image processing device 700 and its constructive components can communicate amongst themselves and/or with other circuits (and/or devices), which execute high-level logic functions, algorithms, as well as executable instructions (e.g., firmware instructions, software instructions, software programs, etc.). Exemplary circuits of this type include discrete elements such as resistors, transistors, diodes, switches, and capacitors. Examples of the processor 702 include microprocessors and other logic devices such as field programmable gate arrays ("FPGAs") and application specific integrated circuits ("ASICs"). Although all of the discrete elements, circuits, and devices function individually in a manner that is generally understood by those artisans that have ordinary skill in the electrical arts, it is their combination and integration into functional electrical groups and circuits that generally provide for the concepts that are disclosed and described herein.

The structure of the components in the image processing device 700 can permit certain determinations as to selected configuration and desired operating characteristics that an end user convey via the graphical user interface or that are retrieved or need to be retrieved by the device. For example, the electrical circuits of the image processing device 700 can physically manifest theoretical analysis and logical operations and/or can replicate in physical form an algorithm, a comparative analysis, and/or a decisional logic tree, each of which operates to assign the output and/or a value to the output that correctly reflects one or more of the nature, content, and origin of the changes that occur and that are reflected by the inputs to the image processing device 700 as provided by the corresponding control circuitry, e.g., in the control circuitry 706.

In one embodiment, the processor 702 is a central processing unit (CPU) such as an ASIC and/or an FPGA that is configured to instruct and/or control operation one or more devices. This processor can also include state machine circuitry or other suitable components capable of controlling operation of the components as described herein. The memory 704 includes volatile and non-volatile memory and can store executable instructions in the form of and/or including software (or firmware) instructions and configuration settings. Each of the control circuitry 706 can embody stand-alone devices such as solid-state devices. Examples of these devices can mount to substrates such as printed-circuit boards and semiconductors, which can accommodate various components including the processor 702, the memory 704, and other related circuitry to facilitate operation of the central control node 700.

However, although FIG. 9 shows the processor 702, the memory 704, and the components of the control circuitry 706 as discrete circuitry and combinations of discrete components, this need not be the case. For example, one or more of these components can comprise a single integrated circuit (IC) or other component. As another example, the processor 702 can include internal program memory such as RAM and/or ROM. Similarly, any one or more of functions of these components can be distributed across additional components (e.g., multiple processors or other components).

Moreover, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In view of the foregoing, a technical effect of one or more embodiments of the proposed systems and methods is to generate images and/or video and/or other output that distinguishes effluent that emanates from a target from background of a scene.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for detecting effluent from a target under observation, said method comprising:
   at an image processing device comprising a processor and memory:
      receiving a first image frame and a second image frame of a scene captured in a field of view of an image capture device;
      identifying a first region in the second image frame with a parameter variation value satisfying a first threshold criteria, the parameter variation value defining a rate of change in a scene parameter between the first image frame and the second image frame; and
      generating an output in response to the presence of the first region in the second image frame,
   wherein the first threshold criteria defines a rate of change in scene temperature between the first image frame and the second image frame, and
   wherein the first region corresponds to a first area of the second image frame in which the parameter variation value meets or exceeds a maximum rate of change of scene temperature between the first image frame and the second image frame.

2. The method of claim 1, further comprising displaying the output as an image on a display.

3. The method of claim 2, wherein the area of the image that corresponds to the first region comprises a first feature that distinguishes the first region from the scene.

4. A method for detecting effluent from a target under observation, said method comprising:
   at an image processing device comprising a processor and memory:
      receiving a first image frame and a second image frame of a scene captured in a field of view of an image capture device;
      identifying a first region in the second image frame with a parameter variation value satisfying a first threshold criteria, the parameter variation value defining a rate of change in a scene parameter between the first image frame and the second image frame; and
      generating an output in response to the presence of the first region in the second image frame,
      displaying the output as an image on a display,
   wherein the area of the image that corresponds to the first region comprises a first color that distinguishes the first region from the scene.

5. A method for detecting effluent from a target under observation, further said method comprising:
   at an image processing device comprising a processor and memory:
      receiving a first image frame and a second image frame of a scene captured in a field of view of an image capture device;
      identifying a first region in the second image frame with a parameter variation value satisfying a first threshold criteria, the parameter variation value defining a rate of change in a scene parameter between the first image frame and the second image frame; and
      generating an output in response to the presence of the first region in the second image frame
   wherein the parameter variation value is calculated according to:

$$PV\ \text{value} = \frac{Pf2 - Pf1}{t}, \text{ and}$$

wherein $P_{f1}$ is the value for the scene parameter in the second image frame, $P_{f2}$ is the value for the scene parameter in the first image frame, and t is the time period that elapses between the first image frame and the second image frame.

6. The method of claim 5, wherein the first threshold criteria defines a rate of change in scene temperature between the first image frame and the second image frame.

7. The method of claim 5, further comprising identifying a second region in the second image frame satisfying a second threshold criteria that is different from the first threshold criteria.

8. The method of claim 7, wherein the second region corresponds to a second area of the second image frame in which the scene temperature falls within a pre-determined range for absolute temperature.

9. The method of claim 7, wherein the output distinguishes the first region from the second region.

10. The method of claim 7, further comprising:
   displaying the output as an image on a display; and
   assigning a first feature to the area of the image that corresponds to the first region and a second feature to the area of the image that corresponds to the second region,
   wherein the first feature and the second feature distinguish the first region from the second region and from the scene.

11. The method of claim 10, wherein the first feature and the second feature comprise, respectively, a first color and a second color that is different from the first color.

12. The method of claim 5, wherein the output comprises a signal that encodes instructions to operate a flow control device.

13. The method of claim 5, wherein the output comprises a signal that encodes instructions to activate an alarm device.

14. The method of claim 5, wherein the output comprises an electronic message readable on a peripheral device, wherein the electronic message comprises content that indicates the presence of the first region in the second image frame.

15. A method for detecting effluent from a target under observation, said method comprising:
   at an image processing device comprising a processor and memory:
      receiving signals from an array of pixels on an image sensor, the signals encoding a first image frame and a second image frame;
      identifying one or more alarm pixels from the array of pixels, the one or more alarm pixels exhibiting a rate of change in temperature from the first image frame to the second image frame that satisfies a threshold criteria;
      generating an output in response to the presence of the one or more alarm pixels,
   wherein the output comprises an image on a display, and
   wherein an area of the image corresponding to the one or more alarm pixels comprises a first color.

16. The method of claim 15, further comprising assigning the one or more alarm pixels a pre-determined value to identify the area of the image with the first color.

17. The method of claim 15, further comprising comparing the number of alarm pixels to a threshold pixel criteria, wherein the first color appears on the image if the number of alarm pixels satisfies the threshold pixel criteria.

18. The method of claim 17, wherein the pre-determined number of pixels criteria defines a minimum number of alarm pixels, and wherein the first color appears if the number of alarm pixels meets or exceeds the minimum number.

19. The method of claim 17, wherein the pre-determined number of pixels criteria define a maximum number of alarm pixels, and wherein the first color appears if the number of alarm pixels is less than or meets the maximum number of alarm pixels.

20. An optical imaging system, comprising:
   an image processing device comprising a processor, memory, and one or more executable instructions stored on the memory and configured to be executed by the processor, the executable instruction comprising one or more executable instructions for:
      receiving a first image frame and a second image frame of a scene;
      identifying a first region with a parameter variation value satisfying a first threshold criteria, the parameter variation value defining a rate of change in a scene parameter between the first image frame and the second image frame; and
      generating an output in response to the presence of the first region in the second image frame,
   wherein the parameter variation value is calculated according to:

$$PV \text{ value} = \frac{Pf2 - Pf1}{t},$$

wherein $P_{f1}$ is the value for the scene parameter in the second image frame, $P_{f2}$ is the value for the scene parameter in the first image frame, and t is the time period that elapses between the first image frame and the second image frame.

21. The optical imaging system of claim 20, further comprising a thermal imaging camera coupled with the image processing device, wherein the thermal imaging camera provides the first image frame and the second image frame.

22. The optical imaging system of claim 20, wherein the first image frame and the second image frame are part of a video stream.

23. The optical imaging system of claim 22, wherein the scene parameter comprises scene temperature.

24. The optical imaging system of claim 20, further comprising a display, wherein the output comprises an image on the display in which the first region is distinguished from the scene.

25. The optical imaging system of claim 20, further comprising an alarm device, wherein the output comprises a signal that encodes instructions to operate the alarm device.

26. A computer readable storage medium comprising one or more executable instructions stored thereon, the one or more executable instructions for detecting effluent in a video stream, wherein executable instructions comprise one or more executable instructions for:
   receiving a first image frame and a second image frame of a scene captured in a field of view of a thermal imaging device;
   identifying a first region with a parameter variation value satisfying a first threshold criteria, the parameter variation value defining a rate of change in a scene parameter between the first image frame and the second image frame;
   generating an output in response to the presence of the first region in the second image frame; and
   calculating the parameter variation value according to:

$$PV \text{ value} = \frac{Pf2 - Pf1}{t},$$

wherein $P_{f1}$ is the value for the scene parameter in the second image frame, $P_{f2}$ is the value for the scene parameter in the first image frame, and t is the time period that elapses between the first image frame and the second image frame.

* * * * *